April 17, 1956 J. H. BORTZ ET AL 2,742,210
FISHING ROD HOLDER
Filed March 2, 1954
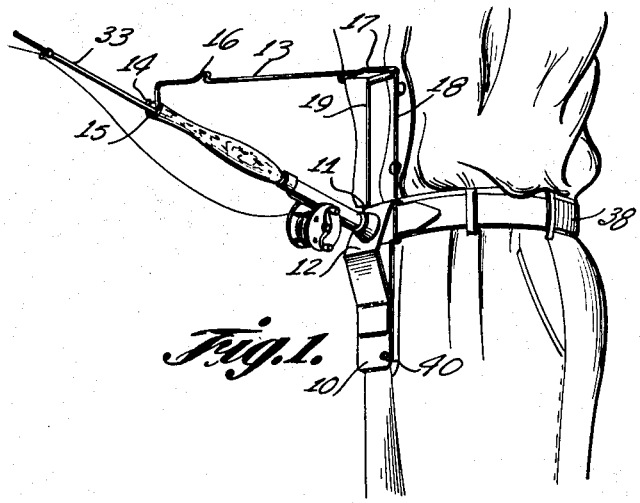
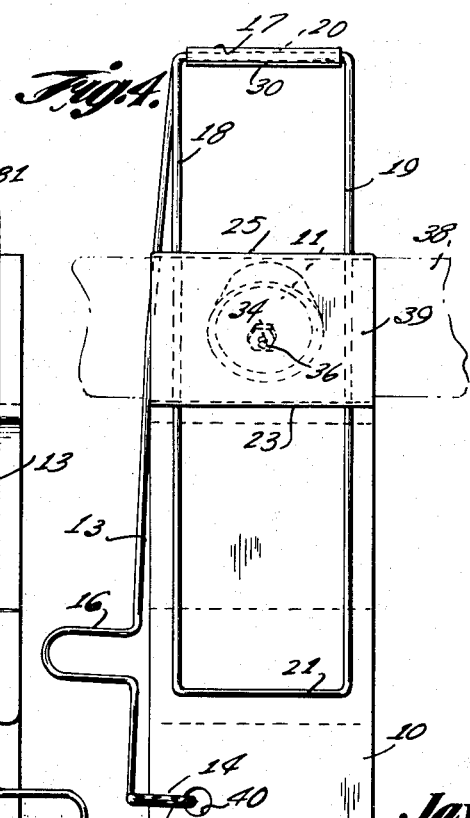
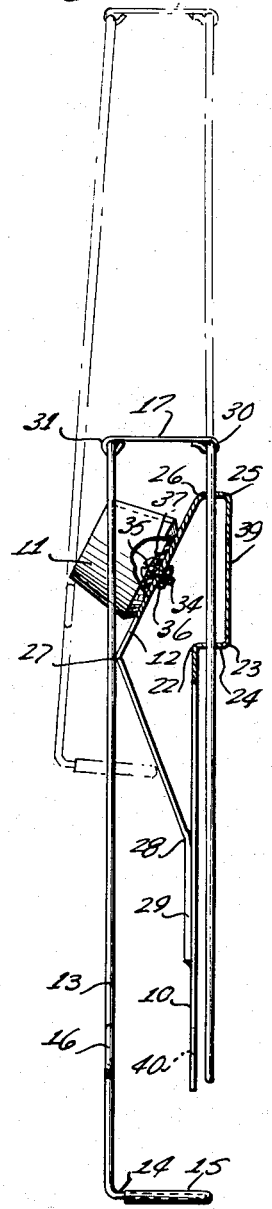
INVENTOR
Jay Homer Bortz
& Mike Charney
BY Victor J. Evans & Co.
ATTORNEYS

United States Patent Office 2,742,210
Patented Apr. 17, 1956

2,742,210

FISHING ROD HOLDER

Jay Homer Bortz and Mike Chorney, Allentown, Pa.

Application March 2, 1954, Serial No. 413,662

3 Claims. (Cl. 224—5)

This invention relates to supports or brackets particularly of the type used with sporting goods, and in particular a bracket adapted to be positioned on a belt and having means thereon for supporting a fishing rod in an outwardly extended position whereby the hands and arms of a fisherman are free, particularly for lighting cigarettes, baiting a hook or rowing a boat.

The purpose of this invention is to provide means for supporting a fishing rod in an outwardly extended position from the body of a fisherman thereby obviating the necessity of holding the fishing rod by hand continuously.

Various types of supports have been provided for holding fishing rods, particularly in boats in trolling and also for still fishing, however, with such devices the fishing rod is spaced from the fisherman and numerous fish are lost because the fisherman must first pick up the pole and then reel in the line. With this thought in mind this invention contemplates a support adapted to be positioned on the belt of a fisherman with a cup of resilient material positioned to receive the end of the handle of a fishing rod and with an arm extended from the upper part of the support for gripping the fishing rod beyond the handle whereby the fishing rod may be supported on the body of a fisherman and in an upwardly inclined position.

The object of this invention is, therefore, to provide a holder for fishing rods that is readily adapted to be installed on the belt of a fisherman and in which the parts are readily adjustable to support the fishing rod in an outwardly extended and upwardly inclined position.

Another object of the invention is to provide a holder for supporting a fishing rod on the body of a fisherman in which the holder is adapted to be folded to a compact position when not in use.

A further object of the invention is to provide a device for supporting a fishing rod on the body of a fisherman in which the device is of a simple and economical construction.

With these and other objects and advantages in view the invention embodies an elongated plate having an outwardly extended portion and also a belt receiving socket formed in the upper part with a cup of rubber, plastic, or the like removably mounted on said outwardly extended portion and with an arm having a hook on the extended end pivotally mounted by a bracket slidably mounted on the plate.

Other features and advantages of the invention will appear from the following description taken in connection with the drawing, wherein:

Figure 1 is a view illustrating the position of the holder with the fishing rod supported thereby and with the holder installed on a belt of a fisherman.

Figure 2 is a side elevational view of the improved fishing rod holder with parts broken away and shown in section and with the parts shown on an enlarged scale and also in which parts are shown in folded positions in full lines and in upwardly extended positions in broken lines.

Figure 3 is a front elevational view of the holder with the parts in folded positions and also with the parts on an enlarged scale.

Figure 4 is a rear elevational view of the holder with the parts as shown in Fig. 3.

Referring now to the drawing wherein like reference characters denote corresponding parts the improved fishing rod holder of this invention includes a base plate 10, a cup 11 of rubber, plastic, or the like mounted on an inclined section 12 of an outwardly extended portion at the upper end of the base plate, and an arm 13 having a hook 14 coated with resilient material 15 on the outer end and a handle 16 spaced from the outer end, said arm being pivotally connected by a link 17 to the upper end of a loop having vertically disposed bars 18 and 19, an upper bar 20 upon which the link 17 is pivotally mounted, and a lower bar 21 which connects the lower ends of the bars 18 and 19.

The plate 10, which is folded upon itself, extends upwardly to a point 22 from which it extends at a right angle to a point 23 providing a section 24 through which the rods 18 and 19 extend and from the point 23 the plate extends upwardly to a point 25 from which it extends at a right angle to a point 26 which forms the upper edge of the inclined section 12 upon which the cup 11 is mounted. The inclined section extends to a point 27 and from the point 27 the plate extends back to the plate 10 at the point 28, providing a flange 29 that is secured, preferably by welding to the plate 10.

The link 17 is formed with a rolled end 30 that extends around the bar 20 connecting the upper ends of the rods 18 and 19 and also a rolled section 31 in which an end 32 of the arm 13 is pivotally mounted. The arm 13 is adapted to extend outwardly, as shown in Fig. 1 for supporting a fishing rod 33 or, in the collapsed position, to hang downwardly, as shown in Figs. 2 and 3.

The cup 11, which is formed of rubber, or other suitable resilient material is secured to the inclined section 12 of the plate 10 with a bolt 34 having a head 35 positioned in the cup, and a nut 36 threaded on the opposite end and, as shown in Fig. 2, a washer 37 may be provided under the head 35.

With the parts designed and assembled as shown and described the device may be carried in the folded or collapsed position and may be installed on a belt by inserting a belt such as the belt 38 through a loop 39 formed between the points 23 and 25 of the plate 10 and with the belt extended through this socket the holder is supported, as shown in Fig. 1. The end of the handle of a fishing rod may then be inserted in the cup 11 and with the arm 13 drawn upwardly with the rods 18 and 19 sliding through the ends of the socket 39 the rubber covered hook 14 is positioned around the extended portion of the fishing rod whereby the rod is supported in an outwardly extended position.

The cup 11 may be provided in different sizes to correspond with different types of fishing rods and the position of the arm 13 is adjusted by raising and lowering the rods 18 and 19 on the supporting plate 10.

With the parts folded the hook 14 may be extended through an opening 40 in the lower edge of the plate 10.

The lazy fisherman being pressed against the body of the fisherman by the leverage and weight of the fishing rod, causes the fisherman to become instantly aware of any normal "strike" by feeding fish, even though said fisherman may not have hand contact with the fishing line or rod or may not be watching the line or rod at the precise moment the "strike" occurs.

The lazy fisherman may be used by the fisherman as a butt grip for his fishing rod while playing an exceptionally large fish where both angler's hands are needed, one hand above the reel holding the rod and the second hand working the reel itself. The receiving cup firmly holding the end of the fishing rod butt, acting as a third hand, gives fisherman complete control of rod in playing heavy fish.

It will be understood that modifications, within the scope of the appended claims, may be made in the design and arrangement of the parts without departing from the spirit of the invention.

What is claimed is:

1. In a fishing rod bracket, the combination which comprises a plate having a belt receiving socket in the upper end and having an inclined plate extended downwardly from the upper end, a cup of resilient material removably mounted on said inclined plate, a loop having a pair of bars joined at one end by a crossbar with the pair of bars mounted on said plate and positioned to slide vertically thereon, and an arm having a hook on the extended end pivotally mounted on the crossbar of said loop.

2. In a fishing rod bracket, the combination which comprises a plate having a belt receiving socket in the upper end and having an inclined plate extended downwardly from the upper end, a cup of resilient material removably mounted on said inclined plate, a loop having a pair of bars joined at one end by a crossbar with the pair of bars mounted on said plate and positioned to slide vertically thereon, and an arm having a hook on the extended end, and a U-shaped portion providing a handle in the intermediate part pivotally mounted on the crossbar of said loop.

3. In a fishing rod bracket, the combination which comprises a plate having a belt receiving socket in the upper end and having an inclined plate extended downwardly from the upper end, a cup of resilient material removably mounted on said inclined plate, a loop having a pair of bars joined at one end by a crossbar with the pair of bars mounted on said plate and positioned to slide vertically thereon, a link pivotally mounted on the crossbar of said loop, and an arm having a hook on the extended end pivotally mounted on said link.

References Cited in the file of this patent

UNITED STATES PATENTS

| 831,150 | Fraser | Sept. 18, 1906 |
| 2,068,054 | Haislip | Jan. 19, 1937 |
| 2,271,136 | Geiger | Jan. 27, 1942 |
| 2,576,624 | Miller | Nov. 27, 1951 |

FOREIGN PATENTS

| 10,333 | Great Britain | July 15, 1915 |